United States Patent [19]
Messinger

[11] 3,820,026
[45] June 25, 1974

[54] MINIMUM RELIABLE SIGNAL INDICATOR FOR AIRCRAFT

[75] Inventor: Norman A. Messinger, Center Square, Pa.

[73] Assignee: Narco Scientific Industries, Inc., Fort Washington, Pa.

[22] Filed: May 17, 1972

[21] Appl. No.: 254,040

[52] U.S. Cl.............................. 325/364, 343/112 R
[51] Int. Cl............................................. G01s 3/02
[58] Field of Search...... 324/98, 103, 133; 325/363, 325/364, 398, 455, 478; 340/214, 224, 248, 421; 343/112 R, 113 R

[56] References Cited
UNITED STATES PATENTS

| | | | |
|---|---|---|---|
| 2,767,310 | 10/1956 | Walker | 325/478 |
| 2,836,713 | 5/1958 | Scott et al. | 324/455 X |
| 2,839,678 | 6/1958 | DeWitz | 325/364 |
| 3,345,464 | 10/1967 | Gillett | 325/455 X |
| 3,479,599 | 11/1969 | Molik | 325/478 |
| 3,665,321 | 5/1972 | Michnik et al. | 325/478 |
| 3,696,301 | 10/1972 | Hoshi | 325/398 |
| 3,718,928 | 2/1973 | Stover | 325/364 X |

*Primary Examiner*—Benedict V. Safourek
*Attorney, Agent, or Firm*—Paul & Paul

[57] ABSTRACT

Apparatus suitable for use in an aircraft receiver equipped with an automatic direction finding system for automatically providing an indication of the strength, relative to a threshold level, of the magnetic component a radio signal being received from a ground based station, comprising an adjustable voltage level detector connected to and monitoring the output of the automatic gain control circuit of the receiver, and producing a bu bi-level output corresponding to whether the magnetic component of the received signals is above or below the threshold, the bi-level output being connected to and driving a suitable indicator so as to positively indicate sub-threshold received signals.

8 Claims, 2 Drawing Figures

3,820,026

MINIMUM RELIABLE SIGNAL INDICATOR FOR AIRCRAFT

BACKGROUND OF THE INVENTION

1. Field of the Invention

This invention lies in the field of automatic warning devices and, more particularly, devices for automatically providing warning that aircraft navigation equipment is receiving signals at or below minimally reliable levels.

2. Description of the Prior Art

In the ground based non-directional beacon navigation system, numerous beacons are provided at selected sites to provide primary or secondary navigation guidance to aircraft in flight. The beacons consist of low frequency (200KC – 1,600KC), low power transmitters and associated antenna systems designed to provide non-directional limited range signals. The beacons may be placed several miles from and generally in line with an airport runway. The beacon may be the sole navigation facility of an airport, in which case the beacon is used in conjunction with a direction finder receiver on the aircraft to provide lateral guidance information to the pilot enabling him to land in "instrument" conditions. The beacon may be an integral part of the instrument landing system, commonly referred to as ILS, in which case the beacon acts as the final fix during an ILS approach procedure. In this case, the beacon is used to position the aircraft at the threshold of the localizer and glide slope guidance systems. In either situation the initial or complete guidance of the aircraft is dependent in large part on the accuracy with which the aircraft direction finder can determine the position of the beacon. This accuracy is largely dependent on the strength of the signal being received from the beacon. Due to a wide variety of beacon transmitter power levels and antenna configurations, the signal strength perceived and the bearing accuracy of a direction finder receiver is not a function of distance to the beacon. For this reason it is desirable to provide an indication to the pilot when the perceived signal strength from a beacon is sufficient to provide reliable guidance information.

In present practice, there is only one way for a pilot to test the approximate strength of the received signal. A test function is included in most modern automatic direction finding (ADF) circuits which allows the relative bearing to be slewed away from its current indication, a rapid return to the current bearing being an indication of bearing reliability. It is, however, possible for ADFs to indicate falsely due to magnetic fields generated by the aircraft when the received signal is relatively weak. For this reason the internal test capability may indicate a "good" bearing when in fact the bearing may be 180° (or any lesser amount) in error.

From the above, it is seen that there exists in the art a need for a device which senses the relative strength of the electrostatic component of the received signal so as not to be affected by the aircraft's magnetic fields. Such a device must be substantially insensitive to surrounding magnetic fields so as to reliably detect when a received signal is strong enough to override the aircraft's magnetic properties, and to alert the pilot when it is too weak to be relied upon.

SUMMARY OF THE INVENTION

It is the primary object of this invention to provide an aircraft device which indicates when a received signal from a ground navigation facility is below a minimum threshold level which can provide reliable navigation guidance.

It is a further object of this invention to provide a device suitable for operation with an aircraft ADF circuit which indicates when a received signal from a low frequency beacon station is below that level which provides reliable guidance information, by using the electrostatic component of the received signal and substantially ignoring any extraneous magnetic signals which can give rise to false indications.

In accordance with the above objectives, there is provided an adjustable voltage sensitive switch which monitors the current controlling the gain of the receiver intermediate frequency amplifiers, said current being proportional to the strength of the electrostatic component of the received signal. When such current is equal to or below a specific value, corresponding to a minimum usable received signal, a voltage derived therefrom causes the voltage sensitive switch to operate to turn on a visual warning device, suitably a light emitting diode. The voltage sensitive switch is adjustable so that its switching voltage may be made to correspond to the minimum received signal which can be reliably detected by the aircraft in which it is placed.

DESCRIPTION OF THE PREFERRED EMBODIMENT

Figure 1:
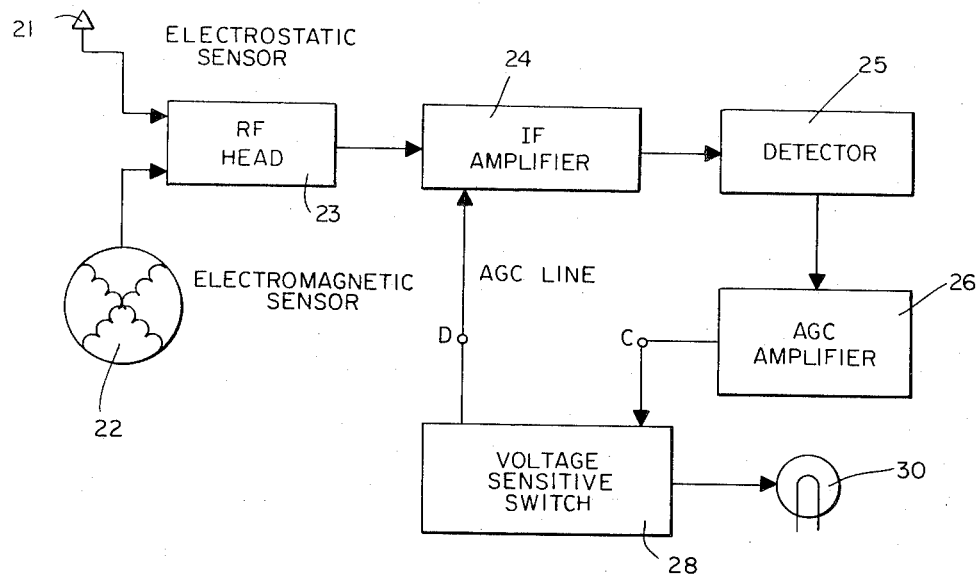
FIG. 1 shows a block diagram of the primary components of the minimum reliable signal indicator device of this invention, and the relation of such device to the aircraft receiver.

Referring now to FIG. 1, there is shown an electrostatic sensor 21 and an electromagnetic sensor 22, which are conventional constituent components in a non-ambiguous ADF system. The electro-static sensor 21 is an isotropic probe of short length relative to the wavelength being received, and non-resonant, such that it senses only the electrostatic component of the received radio signal. The components of ADF systems are well known in the art and, not forming a part of the invention here claimed, need not be further described. However, it is important to an understanding of the invention disclosed herein to note that in such ADF systems, for an incoming signal, the ratio of the signal detected by the electrostatic sensor to that detected by the magnetic sensor is of the order of 20:1. Consequently, the signal which is processed through the receiver may be considered to be substantially free of extraneous magnetic fields, e.g., magnetic fields generated by the aircraft itself. For example, if the extraneous magnetic fields increase the sensed magnetic signal by 100%, the detected signal would still represent 20 parts electrostatic pickup and 2 parts magnetic, such that the total strength of the signal would be changed by only 1 part in 22, or less than 5%. Thus, the strength of the combined signal from the two sensors is substantially independent of the extraneous magnetic fields.

The signals from sensors 21 and 22 are connected to and processed by the RF head 23, which as shown here constitutes the conventional RF amplifier stages, mixer, local oscillator, etc. The signal from RF head 23 is connected to conventional IF amplifier 24, the output of which is connected to conventional detector 25. In a normal receiver without the device of this invention, an output from detector 25 is connected to automatic gain control (AGC) amplifier 26, and from amplifier 26 back to a gain control terminal of IF amplifier 24. Thus, in the prior art normal operation of the receiver, the detector and AGC amplifier drive the gain control port of the IF amplifier, to provide a closed servo loop which maintains the detector output at a constant level. The improvement embodied by this invention comprises connecting, between output terminal C of the AGC amplifier 26, and input terminal D of IF amplifier 24, a voltage sensitive switch 28, which derives a signal proportional to the output of amplifier 26, and compares same to a reference voltage corresponding to the minimum received signal strength which permits reliable operation. The voltage sensitive switch 28 provides a bi-level, or on-off output, which is coupled to and drives indicator 30, suitable a light emitting diode.

Figure 2:
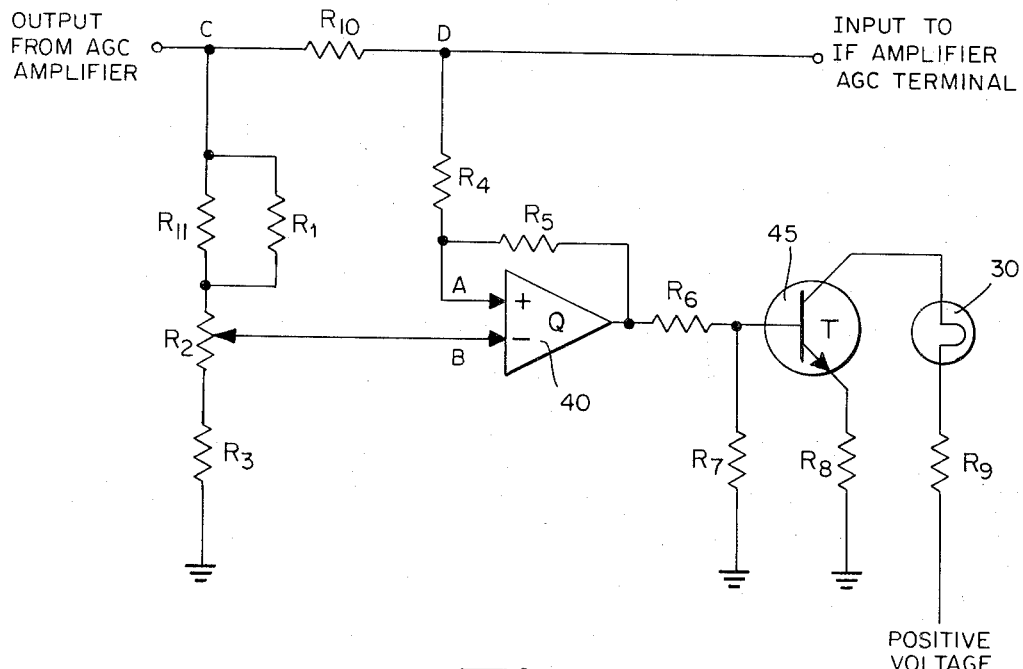
FIG. 2 is a schematic diagram of the electrical circuitry comprising the apparatus of this invention.

Referring now to FIG. 2, there is shown in detail the circuitry of voltage sensitive switch 28. Between terminals C and D there is connected a current sensing resistor $R_{10}$, across which is developed a voltage proportional to the current flowing from AGC amplifier 26 to IF amplifier 24. Between terminal C and ground is connected a voltage divider, composed of resistors $R_1$ and $R_{11}$ in parallel, in series with variable resistor $R_2$ and fixed resistor $R_3$. The movable arm of resistor $R_2$ is connected to the negative input terminal (B) of voltage comparator 40. Connected between terminal D and the positive input terminal (A) of comparator 40 is resistor $R_4$. Resistor $R_5$ is connected between the output of comparator 40 and the positive (A) input terminal thereof. The output of comparator 40 is connected through resistor $R_6$ to the input terminal (base) of transistor 45, said base also being connected through resistor $R_7$ to ground. The emitter of transistor 45 is connected through resistor $R_8$ to ground, while the collector is connected through indicator 30 in series with resistor $R_9$ to a source of positive voltage.

In operation, the current through resistor $R_{10}$ is a direct function of the AGC output, and is approximately proportional to the magnitude of the received signal. Further, since the magnitude of the detected signal is derived substantially from the electrostatic sensor, the current from the AGC port is substantially free of any extraneous magnetic field in and about the aircraft. The two inputs to comparator 40 are derived from the respective voltages at opposite terminals of resistor $R_{10}$, and accordingly represent the strength of the received radio signal. When no signal is being received, the voltage across terminals C and D is equal to some quiescent value established by the parameters of the AGC amplifier. Resistors $R_{11}$, $R_1$, $R_2$ and $R_3$ form an adjustable voltage divider which establishes a voltage at the negative terminal (B) of comparator 40, which is negative as compared to the voltage on the positive terminal (A). Under these conditions, the output of comparator 40 is a high voltage of sufficient magnitude to operate transistor 45, the output circuit of which drives indicator 30 by virtue of current flowing through resistor $R_9$.

When a signal of predetermined value is received at the electrostatic sensor 21, there is sufficient current flow between terminals C and D to raise the voltage at the B input terminal of comparator 40 to a positive value with respect to the voltage at the A input terminal, thus reversing the polarity of terminals A and B and causing the comparator output to switch to a low voltage state. The low voltage output of comparator 40 is communicated to the base of transistor 45, turning it off, in turn turning off indicator 30. In this manner, indicator 30 is driven on for all received signals below a predetermined level, and is off for all such received signals above such predetermined level. It is seen that by adjusting the variable arm of resistor $R_2$, the minimum, or threshold comparison level may be adjusted to any desired level in accordance with the aircraft in which the apparatus of this invention is placed.

From the above it is seen that there is provided a unique apparatus and means for providing an alert signal which tells the pilot of an aircraft when the bearing information displayed on his instrument panel is unreliable. It is noted that the indicator may suitably be a light emitting diode placed in the center of the ADF panel display, or may be any other suitable indicator which may be mounted on the instrument panel. By utilizing a derived electrical signal which is substantially independent of magnetic fields local to the aircraft, the pilot is alerted to the common, and heretofore undetected situation where the ADF is actually sensing a magnetic field generated by the aircraft itself, and thus producing an unreliable signal.

I claim:

1. In an aircraft apparatus for receiving and processing signals, said apparatus being equipped with an automatic direction finding system and antenna sensors for producing an input signal having an electrostatic component substantially greater than its magnetic component, said apparatus also having an AGC amplifier and an IF amplifier, improved apparatus comprising means for developing a signal which represents when the aircraft bearing information is unreliable, said means including means for developing a two state signal representative of the reliable magnetic component of a given received signal, and indicator means driven by the output of said two state means so as to indicate when the aircraft bearing information is unreliable.

2. The apparatus as described in claim 1, wherein said signal developing means comprises means for sensing the AGC amplifier signal, from which said two state signal is developed.

3. The apparatus as described in claim 2, wherein the AGC signal is a current signal, and said developing means includes an input circuit for producing a differential input signal representative of said AGC current signal and an amplifier with differential input terminals, which amplifier receives said differential input signal and which is responsive to the polarity of said input such that it produces an output signal of a first state when the input is of a first polarity and an output signal of a second state when said input is of a second polarity.

4. The apparatus as described in claim 1, wherein said input circuit comprises an adjustable voltage divider adapted to produce an input signal of a first polarity when the aircraft bearing information means is reliable and an input signal of a second polarity when the aircraft bearing information is unreliable.

5. The apparatus as described in claim 4, wherein said indicator means provides a light indication when said two state signal is in a first state, and no light indication when said two state signal is in a second state.

6. In an aircraft receiver for receiving and processing signals, and having a received signal which has an electrostatic component and a magnetic component, said electrostatic component being substantially greater than said magnetic component, a device for detecting when a received signal has a reliable magnetic component which is at or below a minimum strength, comprising:
   a. voltage comparator means adapted for receiving a differential input, for providing a high voltage state output when said input is of a first polarity and a low voltage state output when said input is of a second polarity;
   b. an input circuit connected to the output of said AGC amplifier for deriving a differential input signal which is representative of the reliable magnetic component of said received signal, said input circuit being connected to the input of said comparator means and adapted to provide input signals of opposite polarity corresponding to whether the received signal has a magnetic component which is above or below said minimum strength; and
   c. an output circuit coupled to the output of said comparator means and having an indicator, for providing an indication when said reliable magnetic component of said received signal is below said minimum strength.

7. A method of altering an aircraft pilot when a received radio signal from a ground navigation facility carries a magnetic component such that bearing information is unreliable, comprising:
   a. deriving an electrical signal representative of the signal strength of said received radio signal and substantially independent of other magnetic fields in the vicinity of the aircraft;
   b. comparing said derived signal with a reference to determine when the received signal carries unreliable bearing information; and
   c. driving an indicator in an on condition when said bearing information is unreliable.

8. The method as described in claim 7 wherein said received signal has electrostatic and magnetic components of a given ratio and which are separately sensed, and wherein the step of deriving a representative signal comprises generating a signal which is substantially independent of the magnetic component and in a fixed ratio thereto, whereby said derived signal is representative of the reliable received magnetic component, whereby said indication is an indication of bearing reliability.

* * * * *

UNITED STATES PATENT OFFICE
CERTIFICATE OF CORRECTION

Patent No. 3,820,026   Dated June 25, 1974

Inventor(s) Norman A. Messinger

It is certified that error appears in the above-identified patent and that said Letters Patent are hereby corrected as shown below:

In the Abstract, line 9, after "producing a", delete --bu--.

Column 3, line 24, change "suitable" to --suitably--.

Claim 4, line 1, delete --1-- and insert therefor --3--.

Claim 7, line 1, change "altering" to --alerting--.

Signed and sealed this 1st day of October 1974.

(SEAL)
Attest:

McCOY M. GIBSON JR.
Attesting Officer

C. MARSHALL DANN
Commissioner of Patents